(12) United States Patent
Loh et al.

(10) Patent No.: US 6,752,425 B2
(45) Date of Patent: Jun. 22, 2004

(54) SEMI-ACTIVE CONTROL OF AUTOMOTIVE STEERING SYSTEM VIBRATION WITH MAGNETO-RHEOLOGICAL DAMPING

(75) Inventors: Wei-Yi Loh, Novi, MI (US); Thomas Michael Dalka, Sterling Heights, MI (US); Rena Hecht Basch, Ann Arbor, MI (US); Jiansheng Weng, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,555

(22) Filed: Oct. 30, 2002

(65) Prior Publication Data

US 2004/0084887 A1 May 6, 2004

(51) Int. Cl.[7] ................................................. B62D 1/16
(52) U.S. Cl. ........................ 280/779; 280/90; 180/417; 188/267.2
(58) Field of Search ................................. 280/777, 782, 280/779, 784, 773, 90; 188/267.2, 290; 180/400, 414, 417

(56) References Cited

U.S. PATENT DOCUMENTS

| | | | | |
|---|---|---|---|---|
| 5,549,837 A | * | 8/1996 | Ginder et al. ............. | 252/62.52 |
| 5,573,088 A | * | 11/1996 | Daniels ....................... | 188/267 |
| 5,816,587 A | * | 10/1998 | Stewart et al. ............ | 280/5.516 |
| 5,947,238 A | * | 9/1999 | Jolly et al. ................. | 188/267.2 |
| 5,992,582 A | * | 11/1999 | Lou et al. .................. | 188/267.1 |
| 6,095,295 A | * | 8/2000 | Park et al. ................. | 188/267.2 |
| 6,158,470 A | * | 12/2000 | Ivers et al. ................. | 137/807 |
| 6,279,701 B1 | * | 8/2001 | Namuduri et al. ....... | 188/267.2 |
| 6,279,952 B1 | * | 8/2001 | Van Wynsberghe et al. .......................... | 280/777 |
| 6,296,280 B1 | * | 10/2001 | Struble et al. ............. | 280/777 |
| 6,318,520 B1 | * | 11/2001 | Lisenker et al. ........... | 188/267 |
| 6,318,522 B1 | * | 11/2001 | Johnston et al. ......... | 188/267.2 |
| 6,340,080 B1 | * | 1/2002 | Carlson .................... | 188/267.2 |
| 6,390,253 B1 | * | 5/2002 | Oliver ...................... | 188/267.2 |
| 6,394,239 B1 | * | 5/2002 | Carlson .................... | 188/267.2 |
| 6,427,813 B1 | * | 8/2002 | Carlson .................... | 188/267.2 |
| 6,464,050 B2 | * | 10/2002 | Smith et al. ............. | 188/267.1 |
| 6,497,308 B2 | * | 12/2002 | Lisenker ................... | 188/267.2 |
| 6,547,043 B2 | * | 4/2003 | Card ....................... | 188/267.2 |
| 6,547,044 B2 | * | 4/2003 | Lisenker et al. ......... | 188/267.2 |
| 6,637,558 B2 | * | 10/2003 | Oliver et al. ............ | 188/267.2 |
| 6,679,508 B2 | * | 1/2004 | Smith et al. .................. | 280/90 |

* cited by examiner

*Primary Examiner*—Paul N. Dickson
*Assistant Examiner*—Toan C To
(74) *Attorney, Agent, or Firm*—Gary Smith

(57) ABSTRACT

A magnetorheological (MR) vibration damper for damping axial and rotational vibrations of an automotive steering system may include a housing encasing MR fluid therein and a gear-like rotor and orifice plate disposed within the housing. The rotor and orifice plate, which may be affixed to the steering wheel shaft, includes a plurality of gear-like teeth on its surface and a plurality of holes for producing shear and normal forces, respectively, on the MR fluid. Electric coils may be disposed within the housing for generating an electric field for activating the MR fluid. The MR vibration damper may be activated or deactivated by a controller by comparing a signal value from a steering wheel vibration sensor to a predetermined threshold value. The controller may be programmable by a user to increase or decrease the predetermined threshold value, so as to enable customization of driving feel.

21 Claims, 3 Drawing Sheets

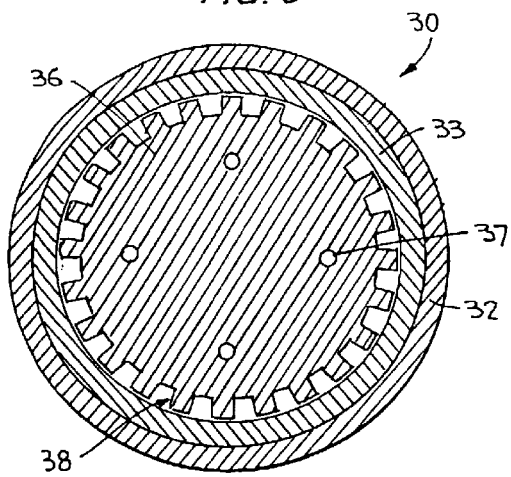
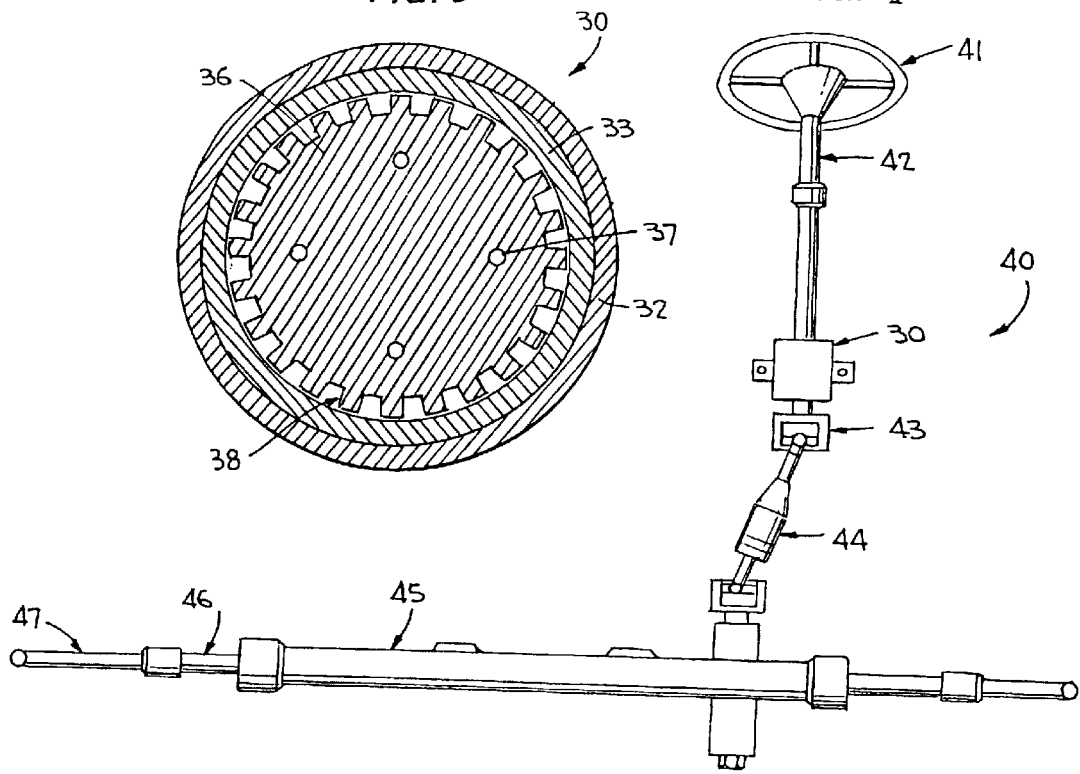
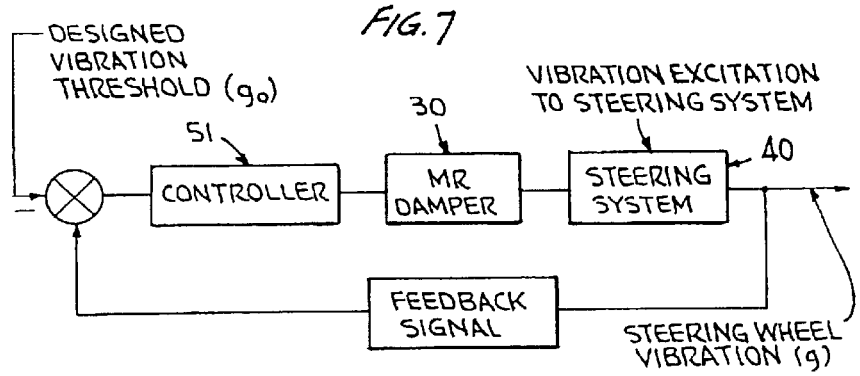

SEMI-ACTIVE CONTROL OF AUTOMOTIVE STEERING SYSTEM VIBRATION WITH MAGNETO-RHEOLOGICAL DAMPING

BACKGROUND OF INVENTION a. Field of Invention

The invention relates generally to vibration damping, and, more particularly to damping of an automotive steering system by magnetorheological fluids.

b. Description of Related Art

A need exists for a system for damping steering wheel vibrations to levels less objectionable or undetectable to a driver; a system that may be easily and economically manufactured, and a system that operates efficiently and reliably under a variety of vibration conditions.

Steering wheel nibble is defined as an unexpected rotational vibration that the driver feels through the steering wheel. Steering wheel nibble, hereinafter referred to as steering wheel vibration, leads to a significant number of customer complaints on many vehicles, and may cause premature deterioration of vehicular components. Steering wheel vibration is generally caused by factors such as brake roughness, brake torque variation, tire/wheel imbalance, and road load input being transmitted through the steering system to the driver. Steering wheel vibration caused by brake torque variation, which is typically generated from disc thickness variation is usually referred to as "brake roughness." The rotational vibration on the steering wheel caused by unbalanced tires/wheels and road load is traditionally known as "nibble." The vibration excitations from these three categories are all transmitted through the suspension system to the steering system, as shown for example in FIG. 1. Since steering wheel vibration is caused by many different vibration excitations, it is difficult to target each source of vibration with a general, yet effective engineering solution.

Because suspension plays a critical role in transmitting vibration from, for example, brake roughness, road load input and tire/wheel imbalance, hydraulic and/or elastomeric bushings have been conventionally used as the primary damper to reduce suspension vibration caused by such factors. One limit to this approach is the large package space required for components such as hydraulic bushings, which is often unavailable. The use of elastomeric bushings is also limited to vibration reduction for specific frequencies. Accordingly, major structural and chassis system redesigns are necessary to implement these solutions over a wide range of vibration frequencies. Moreover, the durability of these components is of major concern, and the cost of hydraulic bushings is very high.

Various conventional steering wheel vibration suppression methods and devices are known and disclosed, for example, in U.S. Pat. No. 6,296,280 to Struble et al., U.S. Pat. No. 6,279,952 to Van Wynsberghe et al., U.S. Pat. No. 6,120,046 to Daly, U.S. Pat. No. 6,152,488 to Hedderly et al., U.S. Pat. No. 5,794,508 to Gerigk, U.S. Pat. No. 5,549,837 to Ginder et al., U.S. Pat. No. 4,942,947 to Shtarkman, U.S. Pat. No. 4,503,952 to Hesse, U.S. Pat. No. 4,458,915 to Emery, and U.S. Pat. No. 3,941,401 to Allison.

The above-identified U.S. Patents generally employ methods such as hydraulic dampeners, viscosity control of rheological fluids, rubber sleeves, shock absorbers and magnetorheological (MR) fluids for steering wheel vibration suppression.

U.S. Pat. No. 5,549,837 to Ginder et al., describes MR fluids for vibration damping. The device of Ginder '837 utilizes the shear force between a rotational moving part and MR fluids to provide braking force when a field is applied. However, Ginder '837 is limited in application to purely axial, as opposed to rotary and axial, damping of a piston in a housing (see FIG. 3 of Ginder '837). Moreover, the tie rod force caused by brake vibration in a vehicle is usually about 250 350 lbs. With such strong vibration forces, the pure shear force produced by the rotary MR device in Ginder '837 is not sufficient to dampen this vibration unless the MR device is extremely large, which would render such a solution impractical.

For the U.S. Patents cited above, from a design and manufacturing standpoint, the manufacture of the relatively complicated vibration suppression devices of the past has resulted in a significant increase in the overall manufacturing cost of vehicles, which are typically manufactured by the hundreds of thousands. From an assembly standpoint, the assembly and installation of complex vibration suppression devices can be time-consuming and burdensome, and can also add significantly to the overall cost of a vehicle. Lastly, from a maintenance and use standpoint, conventional vibration suppression devices have frequently failed to suppress steering wheel vibrations over a wide range of vibration frequencies, and have often failed to provide a level of durability expected in today's demanding consumer market.

SUMMARY OF INVENTION

The invention solves the problems and overcomes the drawbacks and disadvantages of the prior art steering wheel vibration suppression devices by providing a magnetorheological (MR)damping device that can be applied to a vehicle's steering system to resist strong vibration forces caused by factors such as brake torque variation, wheel/tire imbalance, and road load input.

Thus, an aspect of the present invention is to provide a vibration damping device capable of effectuating low frequency vibration damping, and having a high damping force capability.

Another aspect of the present invention is to provide a device capable of simultaneous rotational and axial damping.

Yet another aspect of the present invention is to provide a device that may be packaged in a small space, without requiring significant vehicle structural redesign.

The invention accomplishes these aspects by providing a magnetorheological vibration damper for damping axial and rotational vibrations of an automotive steering system. The damper may include a housing encasing magnetorheological fluid therein and a rotor and orifice plate disposed within the housing. The rotor and orifice plate may include protrusions formed as teeth on its surface, and holes and/or slots. The rotor and orifice plate may be affixed to the automotive steering system or formed with the automotive steering system. Electric coils may also be provided within the housing for generating an electric field for activating the magnetorheological fluid.

For the damper described above, the cross-section of the housing and/or the rotor and orifice plate may be circular or elliptical. The teeth may extend fully or partially along an axial length of the rotor and orifice plate. The rotor and orifice plate may be formed with the automotive steering system or mounted to the automotive steering system. The holes and/or slots may extend fully or partially through the rotor and orifice plate along an axial length thereof, and may be disposed parallel or transverse to the central axis of the rotor and orifice plate. The damper may be mounted along a length of a steering shaft of a vehicle.

The present invention further provides a system for damping vibrations in a vehicle. The system may include the magnetorheological vibration damper, as described above. The system may further include a control system for controlling operation of the damper. The control system may include a steering wheel vibration sensor and a controller for activating the damper if a signal value from the steering wheel vibration sensor exceeds a predetermined threshold and deactivating the damper if the signal value is below the predetermined threshold. The controller may be programmable by a user to increase or decrease the predetermined threshold.

The present invention yet further provides a method of damping automotive steering system vibrations. The method includes the step of mounting a magnetorheological vibration damper to the automotive steering system. The method further includes the steps of flowing magnetorheological fluid through holes and/or slots in a rotor and orifice plate disposed within the damper, and flowing the magnetorheological fluid by protrusions on a surface of the rotor and orifice plate. The method yet further includes the step of activating the magnetorheological fluid by generating an electric field so as to cause axial and rotational damping of the automotive steering system.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 4 is an illustrative view of a steering system showing a MR damper according to the present invention mounted in the steering system;

FIG. 6 is a sectional top view of the MR damper of FIG. 4, illustrating the components of the MR damper; and FIG. 7 is an illustrative diagram of a control logic scheme for controlling the MR damper of the present invention.

DETAILED DESCRIPTION

The present invention uses a combination of principles of vibration control and mechanical behavior of magnetorheological (MR) fluids to dissipate the vibration energy of a steering system caused by vibration from loads such as brakes, tires, wheels and/or the road.

Before describing the MR damper of the present invention, properties of MR fluids will first be described in detail.

Figure 1:
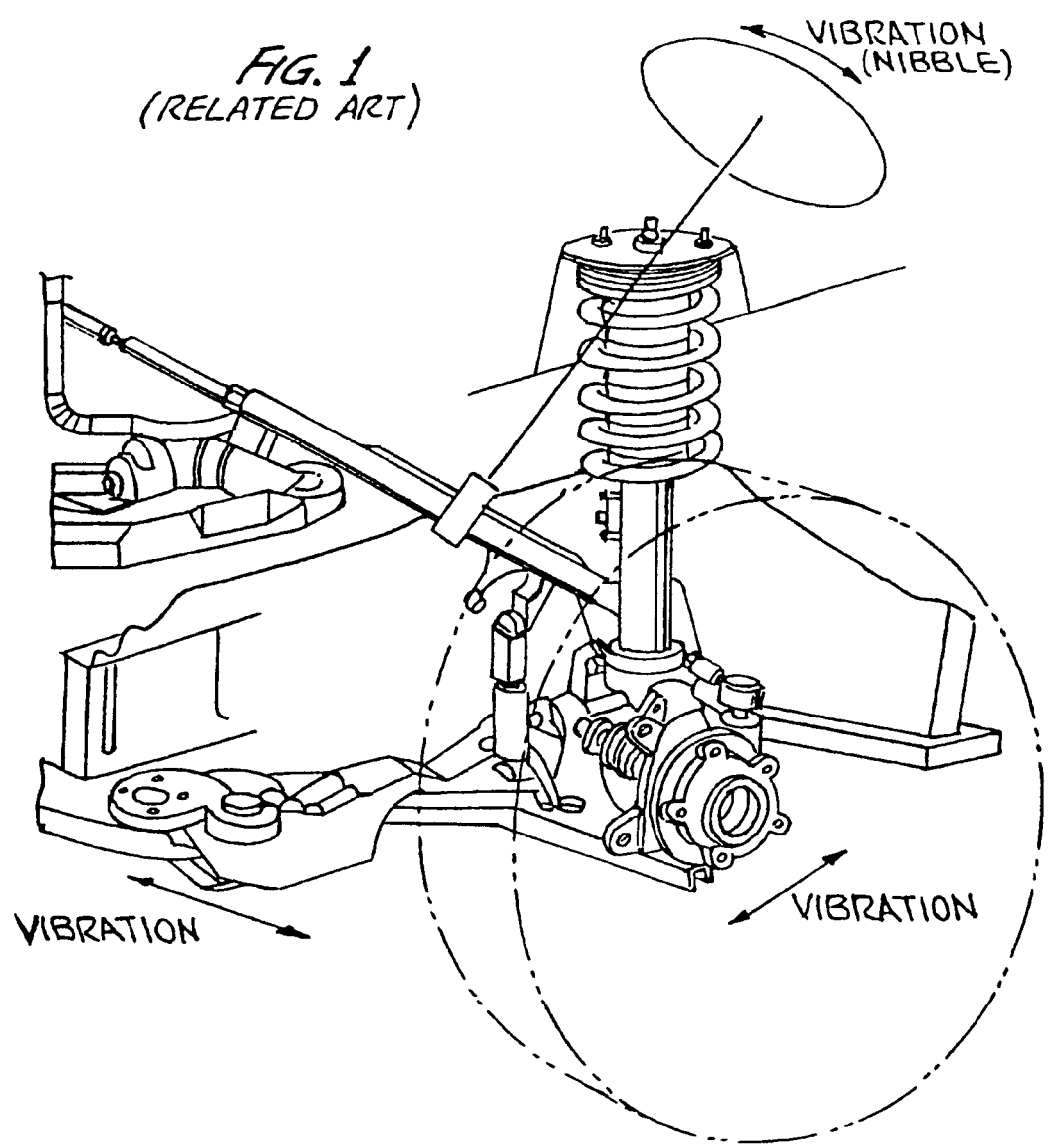
FIG. 1 is an illustrative view of a related art vehicle suspension system showing the primary path of vibration transmission to a steering wheel.
Figure 2:
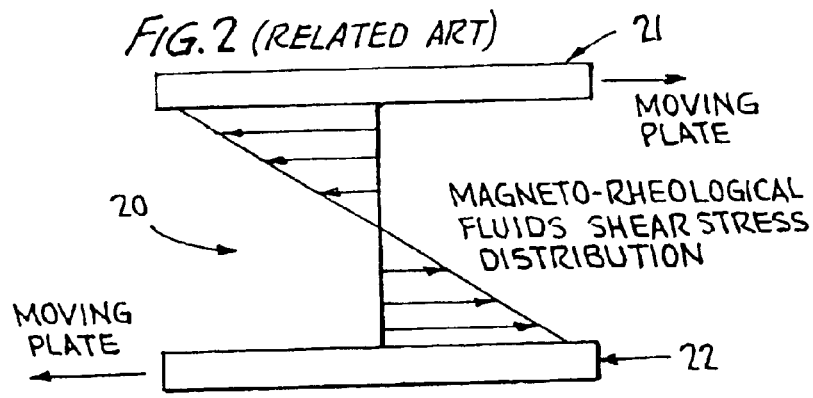
FIG. 2 is an illustrative diagram showing MR fluid shear stress distribution.

MR fluids in general exhibit Newtonian behavior and can be used to produce damping. The yield strength of an MR material increases with the application of a magnetic field. As shown in FIG. 2, if MR fluid 20 is placed in a gap between two moving plates 21 and 22, and a magnetic field is applied, a shear stress distribution results in MR fluid 20. When the shear stress, $\tau_s|$, generated between plates 21 and 22 and MR fluid 20 exceeds the MR yield strength, $\tau y$, , the total shear stress can be calculated as:

$$\tau = \tau_y(H) + \eta \dot{y},$$

where H is an applied magnetic field, $\eta|$ is the MR fluid viscosity and $\dot{y}$ is the flow shear rate. If the shear stress, $\tau_s|$, generated by the shear motion between the plates and MR fluid 20 is less than the MR yield strength, the shear stress of MR fluid 20 is simply, $$\tau = Gy,|,$$

where G and y| are shear modulus and shear strain of MR fluid 20, respectively. The total shear force between moving plates 21 and 22 and MR fluid 20 acts in the direction opposite to the motion of plates 21 and 22. This total shear force is the product of the MR fluid shear stress and the contact area of plates 21 and 22. This shear force provides damping to inhibit movement of plates 21 and 22. Thus, in order to maximize the damping produced by MR fluid 20, one key factor is maximization of the interface between MR fluid 20 and the contacting mechanical part(s) (i.e. plates 21 and 22).

Figure 3:
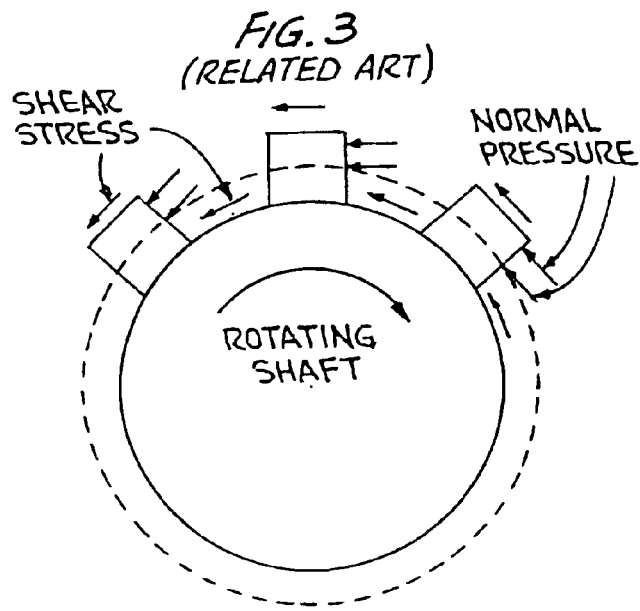
FIG. 3 is an illustrative diagram showing stress distribution of a rotating shaft in an MR fluid.

As shown in FIG. 3, the total force resisting rotating motion of a part can be calculated by:

$$F = A_f \tau + A_n p,$$

Where $A_f$ and $A_n|$ are the area tangential and normal to MR fluid 20, respectively, and p is the pressure of MR fluid 20 acting on the rotating part surface $A_n|$.

The design of a MR damper according to the present invention, which incorporates the above-identified MR fluid properties, will now be described in detail.

Figure 5:
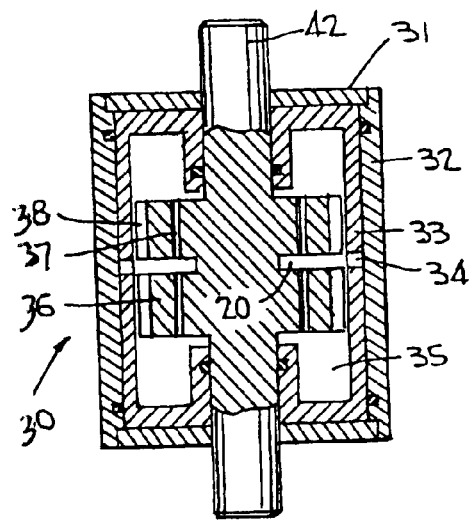
FIG. 5 is a sectional side view of the MR damper of FIG. 4, illustrating the components of the MR damper.

As shown in FIGS. 4 and 5, a MR damper according to the present invention, generally designated 30, may be mounted in a steering system 40. Steering system 40 generally includes standard steering components such as, steering wheel 41, upper steering shaft 42, upper universal joint 43, intermediate steering shaft 44, steering rack housing 45, steering rack 46 and tie rod 47. MR damper 30 may be mounted onto upper steering shaft 42, between steering wheel 41 and upper universal joint 43, as shown in FIG. 4, or alternatively may be mounted at a different location on steering system 40, as would be apparent to a skilled artisan.

Referring next to FIGS. 5 and 6, MR damper 30 may include a cover 31, housing 32, magnetic hub 33, magnetic isolator 34, MR fluid 20, electric coils 35, rotor and orifice plate 36, axial holes 37 and gear-like teeth 38. Rotor and orifice plate 36 may be mounted onto or formed with upper steering shaft 42, and uses both the normal and shear forces generated in MR fluid 20 to suppress vibrations. Specifically, referring back to FIG. 3, gearteeth 38 on rotor and orifice plate 36 produce both shear force and normal force in MR fluid 20. As discussed above, the normal force is much more effective and efficient than the shear force at creating damping. In order to accomplish simultaneous rotational and axial damping, axial holes 37 operate in conjunction with MR fluid 20 to provide axial damping. Thus, the gear-like design for rotor and orifice plate 36 maximizes the contact surface area between rotor and orifice plate 36 and MR fluid 20.

It should be evident that instead of gear-like teeth 38, rotor and orifice plate 36 may include a variety of surface contours and protrusions, as would be apparent to a skilled artisan. The surface of rotor and orifice plate 36 itself may be finished coarse to maximize the area of contact for MR fluid 20. Likewise, slots or other such cutouts may be provided instead of, or in conjunction with, axial holes 37, and may be provided transverse to an axis of rotor and orifice plate 36. Axial holes 37 may also extend fully through rotor and orifice plate 36, as shown in FIG. 5, or may partially extend through rotor and orifice plate 36. Moreover, as long as rotor and orifice plate 36 is allowed to freely rotate in housing 32, it should be evident that housing 32 and/or rotor and orifice plate 36 may have a circular, elliptical or another equivalent cross-section.

As shown next in FIG. 7, in order to eliminate the vibration along and around steering shafts 42 and 44 without affecting other vehicle performance requirements, the magnetic field applied to MR damper 30 may be controlled by a control system 50. For accomplishing this, the acceleration associated with the steering wheel vibration, g, may be constantly monitored and fed back to a controller 51 for comparison with a predesigned vibration threshold, go. The acceleration may be measured by conventional devices, such as strain gauges and the like, placed along steering shafts 42 and 44. Thus, vibration of shafts 42 and 44 may be used to calculate vibration of steering wheel 41. Specifically, for a steering wheel vibration level, g, exceeding the predesigned vibration threshold, go, controller 51 would activate a magnetic field to activate MR damper 30 so as to generate a damping force against the vibration motion of steering wheel 41. Alternatively, for a steering wheel vibration level, g, of less than the predesigned vibration threshold, go, controller 51 would deactivate the magnetic field, and MR damper 30 would remain inactive.

It should be evident that controller 51 may be designed to control the magnetic field applied to MR damper 30 adaptively for different levels of steering wheel vibrations, as would be apparent to a skilled artisan. For such semior variable vibration control, predesigned vibration threshold, go, may also be programmable by a user for a tailored "drive feel" without impacting performance characteristics such as, ride, handling and steering effort.

It should be evident that MR damper 30 of the present invention provides an efficient means of improving steering feel, and is applicable to all steering systems, including racksystems. As shown in FIG. 4, MR damper 30 also requires minimum hardware space and is cost-effective. Compared to conventional steering wheel vibration suppression methods, MR damper 30 efficiently suppresses low frequency vibrations and has a high damping force capability. Moreover, MR damper 30 simultaneously provides rotational and axial damping.

Thus, in capsule, the MR damper 30 described above provides a simple and cost-effective means of vibration damping, without changing any original requirements or characteristics of the vehicle system.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A magnetorheological vibration damper for damping axial and rotational vibrations of an automotive steering system, said damper comprising:
    a housing encasing magnetorheological fluid therein;
    a gear-shaped rotor and orifice plate disposed within said housing, having at least one protrusion provided on a surface of said rotor and orifice plate for causing rotational damping of the automotive steering system, having at least one of at least one hole and at least one slot, and affixed to the automotive steering system; and
    electric coils disposed within said housing for generating an electric field for activating said magnetorheological fluid so as to cause axial and rotational damping of the automotive steering system.

2. A damper according to claim 1, wherein cross-sections of said housing and said rotor and orifice plate are one of circular and elliptical.

3. A damper according to claim 1, wherein said at least one protrusion is formed as teeth on said gear-shaped rotor and orifice plate.

4. A damper according to claim 3, wherein said teeth extend one of fully and partially along an axial length of said rotor and orifice plate.

5. A damper according to claim 1, wherein said rotor and orifice plate is one of formed with the automotive steering system and mounted to the automotive steering system.

6. A damper according to claim 1, wherein said at least one hole or said at least one slot extend one of fully and partially through said rotor and orifice plate along an axial length of said rotor and orifice plate.

7. A damper according to claim 1, wherein said at least one hole and said at least one slot extend one of fully and partially through said rotor and orifice plate transverse a central axis of said rotor and orifice plate.

8. A damper according to claim 1, wherein said damper is mounted along a length of a steering shaft of a vehicle.

9. A system for damping automotive steering system vibrations, said system comprising:
    a magnetorheological vibration damper for damping axial and rotational vibrations of the automotive steering system, said damper comprising;
        a housing encasing magnetorheological fluid therein;
        a gear-shaped rotor and orifice plate disposed within said housing, having at least one protrusion provided on a surface of said rotor and orifice plate for causing rotational damping of the automotive steering system, having at least one of at least one hole and at least one slot, and affixed to the automotive steering system; and
        electric coils disposed within said housing for generating an electric field for activating said magnetorheological fluid so as to cause axial and rotational damping of the automotive steering system; and
    a control system for controlling operation of said damper.

10. A system according to claim 9, wherein cross-sections of said housing and said rotor and orifice plate are one of circular and elliptical.

11. A system according to claim 9, wherein said at least one protrusion is formed as teeth on said gear-shaped rotor and orifice plate.

12. A system according to claim 11, wherein said teeth extend one of fully and partially along an axial length of said rotor and orifice plate.

13. A system according to claim 9, wherein said rotor and orifice plate is one of formed with the automotive steering system and mounted to the automotive steering system.

14. A system according to claim 9, wherein said at least one hole or said at least one slot extend one of fully and partially through said rotor and orifice plate along an axial length of said rotor and orifice plate.

15. A system according to claim 9, wherein said at least one hole and said at least one slot extend one of fully and partially through said rotor and orifice plate transverse a central axis of said rotor and orifice plate.

16. A system according to claim 9, wherein said damper is mounted along a length of a steering shaft of a vehicle.

17. A system according to claim 9, wherein said control system comprises:

steering wheel vibration sensor; and a controller for activating said damper if a signal value from said steering wheel vibration sensor exceeds a predetermined threshold and deactivating said damper if said signal value is below said predetermined threshold.

18. A system according to claim 17, wherein said controller is programmable by a user to increase or decrease said predetermined threshold.

19. A method of damping automotive steering system vibrations, said method comprising the steps of:

mounting a magnetorheological vibration damper to the automotive steering system;

flowing magnetorheological fluid through at least one of at least one hole and at least one slot in a gear-shaped rotor and orifice plate disposed within said damper;

flowing said magnetorheological fluid by at least one protrusion provided on a surface of said rotor and orifice plate for causing rotational damping of the automotive steering system; and activating said magnetorheological fluid by generating an electric field so as to cause axial and rotational damping of the automotive steering system.

20. A method according to claim 19, wherein said rotor and orifice plate includes teeth, said teeth extend one of fully and partially along an axial length of said rotor and orifice plate.

21. A method according to claim 19, further comprising the step of controlling activation of said magnetorheological fluid by a controller so as to activate said damper if a signal value from a steering wheel vibration sensor exceeds a predetermined threshold and deactivate said damper if said signal value is below said predetermined threshold.

* * * * *